(12) United States Patent
Miyamoto et al.

(10) Patent No.: US 8,169,691 B1
(45) Date of Patent: May 1, 2012

(54) MULTI COLOR DISPLAY PANEL

(75) Inventors: Takashi Miyamoto, Tokyo (JP); Ryuji Doi, Tokyo (JP); Tomoyuki Syukunami, Tokyo (JP); Fumihiko Nakatsu, Tokyo (JP)

(73) Assignee: Toppan Printing Co., Ltd. (JP)

( * ) Notice: Subject to any disclaimer, the term of this patent is extended or adjusted under 35 U.S.C. 154(b) by 0 days.

(21) Appl. No.: 13/052,007

(22) Filed: Mar. 18, 2011

(51) Int. Cl.
*G02B 26/00* (2006.01)
*G09G 3/34* (2006.01)

(52) U.S. Cl. .................. 359/296; 359/253; 345/107

(58) Field of Classification Search .......... 359/296, 359/252, 253; 345/106–108; 428/332, 523, 428/702
See application file for complete search history.

(56) References Cited

U.S. PATENT DOCUMENTS

| | | | |
|---|---|---|---|
| 7,177,067 B1 * | 2/2007 | Sakamoto | 359/296 |
| 8,064,126 B1 * | 11/2011 | Miyamoto et al. | 359/296 |

FOREIGN PATENT DOCUMENTS

| | | |
|---|---|---|
| JP | B-S50-15115 | 2/1975 |
| JP | 2002-365668 | 12/2002 |
| JP | 2003-156770 | 5/2003 |
| JP | 2003-161964 | 6/2003 |
| JP | 2003-295234 | 10/2003 |

OTHER PUBLICATIONS

"Brief explanation of JP-B-S50-15115" in English as made by applicants.

* cited by examiner

*Primary Examiner* — Loha Ben
(74) *Attorney, Agent, or Firm* — Squire Sanders (US) LLP

(57) ABSTRACT

One embodiment of the present invention is a multi color display panel, having a transparent substrate, a color filter layer, a transparent electrode layer, a microcapsule layer, an adhesive layer; and a rear electrode plate, wherein the rear electrode plate is an electrode plate in which a pixel electrode is arranged on a substrate, a film thickness of the color filter layer is 0.5-2.0 μm, a step between pixels or inside a pixel inside a display screen, the step being difference of the film thickness, is equal to or less than 0.3 μm, one of the pixels does not overlap an adjacent pixel, and a top edge of each of the pixels of a trapezoid shape is within 5.0 μm from a border of the pixel.

2 Claims, 4 Drawing Sheets

MULTI COLOR DISPLAY PANEL

BACKGROUND OF THE INVENTION

1. Field of the Invention

The present invention is related to a microcapsule type electrophoresis display panel with a color filter. The panel has a structure in which a microcapsule layer is sandwiched between a pair of electrode plates facing each other, one of the electrode plates being a transparent substrate with a color filter layer and an electrophoresis ink is enclosed in a microcapsule in the microcapsule layer. The use of a color filter suitable for the above components can improve the quality of an image of a multi color display panel.

2. Description of the Related Art

In recent years, due to the development of information devices, various information displays are also being developed. A CRT or a liquid crystal using a backlight are main stream display panels of variable information. However, when a light emitting type display such as a CRT or a liquid crystal display using a backlight is watched for a long time, the human has eye becomes strained. Therefore, such a display is not suitable for reading a document or the like for a long time.

In addition, a screen in a liquid crystal display without a backlight becomes very dark due to the use of a polarizing plate which reduces visibility. Further, a display image of these displays does not have memory characteristics. If an electric energy supply is stopped, a display image suddenly disappears. Therefore a display which does not cause eye strain, has excellent visibility, low power consumption and images having memory characteristics is required.

As a reflection type display device which rarely causes eye strain, for example, an electrophoresis type display panel is proposed as shown in patent document 1, the electrophoresis display panel having a pair of mutually facing electrodes and an electrophoresis display layer arranged between the electrodes. This electrophoresis type display panel displays a character or an image by reflection light. This principle is the same as in printed paper. Therefore, the display panel rarely causes eye strain and is suitable for viewing for long periods.

The principle of this electrophoresis display panel is as follows. A voltage is applied to a dispersion liquid in which an electrically charged particle is dispersed. Thereby, the charged particle moves, and image display becomes possible. A microcapsule type electrophoresis display panel in which a colored charged particle is enclosed in a microcapsule and the microcapsule is arranged between a pair of mutually facing electrodes has advantages such as low driving voltage and highly flexibility and is being used practically and continuously developed.

This electrophoresis panel is suitable as a substitute for a display of an information portable device such as a PDA (personal digital assistance) or an electronic book which are predicted to be used widely, or a printed matter such as a newspaper, a book, a magazine and a poster, or displaying a hard copy on paper from a printer. The electrophoresis panel generally has a structure of two color displays (white and black display). However, in recent years, multi-color colorization is required for the purpose of displaying the magazine or a color printed matter.

In order to realize a multi-color colorization of the electrophoresis panel, the following ideas are disclosed. For example, using an electrophoresis particle of multi-color equal to or more than two colors, the particle is arranged in a predetermined pixel by patterning using photolithography (patent document 2) or by photolithograph and ink-jet (patent document 3). In addition, in patent document 4, a cell frame for receiving a microcapsule is formed in advance and a plurality of microcapsules are surely arranged in a desirable position, thereby display of a plurality of colors becomes possible. However, arranging multi-color microcapsules at a predetermined pixel requires more processes and is complex. Therefore, there are actually many technological difficulties.

Therefore, in patent document 5, a color filter substrate is attached to a white and black electrophoresis display panel. Thereby, it is possible to display multi colors without accurate position adjustment between a microcapsule and a pixel. However, in this method, because a separately manufactured color filter is attached on a white and black reflection type electrophoresis display panel, it is necessary to arrange an adhesive for the attachment. Therefore, display brightness is low and attachment of a color filter is difficult which reduces productivity. Further, because the distance between a color filter layer and an electrophoresis display layer is large, there is a disparity in color depending on the viewing angle. An advantage of electronic paper, which is not influenced by the viewing angle, disappears.

Then, the inventors of the present invention found that, in the case where a microcapsule ink is directly formed on a transparent electrode layer of a color filter, display brightness and a viewing angle can be improved. However, the influence of a change in a film thickness of a color filter layer on reflection density becomes larger. An application liquid in which a microcapsule is dispersed has a very high thixotropy. Therefore, non-uniformity of an application liquid which is generated due to non-uniformity of an underlying surface does not become flat or uniform even in a state before drying. Therefore, flatness of a color filter in a observer side, the color filter being an underlying surface of a transparent electrode layer to be coated by a microcapsule, is important in order to display using a color filter with a high definition without non-uniformity over the entire display screen.

Patent document 1: JP-B-S50-015115
Patent document 2: JP-A-2002-365668
Patent document 3: JP-A-2003-156770
Patent document 4: JP-A-2003-295234
Patent document 5: JP-A-2003-161964

The present invention was made by considering the above background. The object of the present invention is to provide a multi color display panel with excellent uniform display quality in which reduction of display brightness and narrowing of a viewing angle are resolved.

SUMMARY OF THE INVENTION

As a result of a study of the above problem, the inventors found the following facts and the invention was made. In the case where a flatness of a color filter layer is adjusted within a certain range, a microcapsule ink is easily and uniformly applied wherein non-uniformity of density is small and thereby a multi color display panel which has an improved image quality can be obtained.

That is, a first aspect of the present invention is a multi color display panel, having a transparent substrate, a color filter layer, a transparent electrode layer, a microcapsule layer, an adhesive layer and a rear electrode plate, wherein the transparent substrate, the color filter layer, the transparent electrode layer, the microcapsule layer, the adhesive layer and the rear electrode plate are arranged in that order, wherein the microcapsule layer is directly formed on the transparent electrode layer, the microcapsule layer is comprised of a binder resin and a microcapsule, the microcapsule being dispersed in the binder resin, a dispersion liquid in which electrophoresis particles are dispersed in a transparent dispersion medium is enclosed in the microcapsule, and an optical reflection property of the microcapsule changes by a change of an electric field by an applied voltage, the rear electrode plate is an electrode plate in which a pixel electrode is arranged on a substrate, a film thickness of the color filter layer is 0.5-2.0 µm, a step between pixels or the interior of a pixel inside a display screen, the step being difference of the film thickness, is equal to or less than 0.3 µm, one of the pixels does not overlap with an adjacent pixel, and a top edge of each of the pixels of a trapezoid shape is within 5.0 µm from a border of the pixel.

A second aspect of the present invention is the color display panel according to claim 1, wherein the electrophoresis particles are two kinds of particle having different surface electric charges, one being a colored particle and the other being a white particle.

1 . . . a transparent substrate; 2 (RGB) . . . a color filter layer; 4 . . . a transparent electrode layer; 5 . . . a microcapsule; 6 . . . a colored particle; 7 . . . a white particle; 8 . . . a transparent dispersion medium; 9 . . . a microcapsule shell; 10 . . . a microcapsule layer; 11 . . . a binder resin; 16 . . . an adhesive layer; 30 . . . a pixel electrode; 50 . . . a rear plate.

DETAILED DESCRIPTION OF THE INVENTION

Hereinafter, a multi color display panel is explained in detail based on an embodiment.

Figure 1:
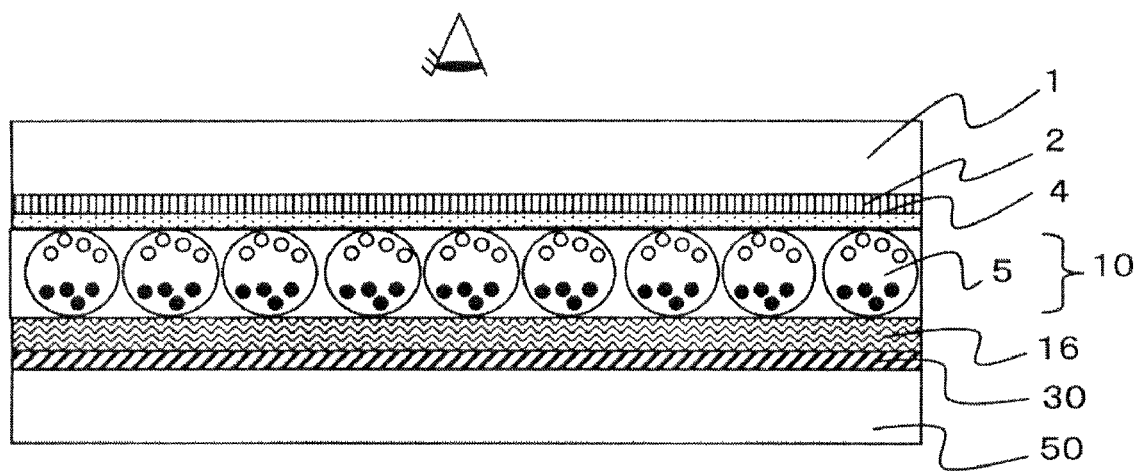
FIG. 1 is a schematic cross sectional diagram explaining a structure of one embodiment of a multi color display panel of the present invention.
Figure 2:
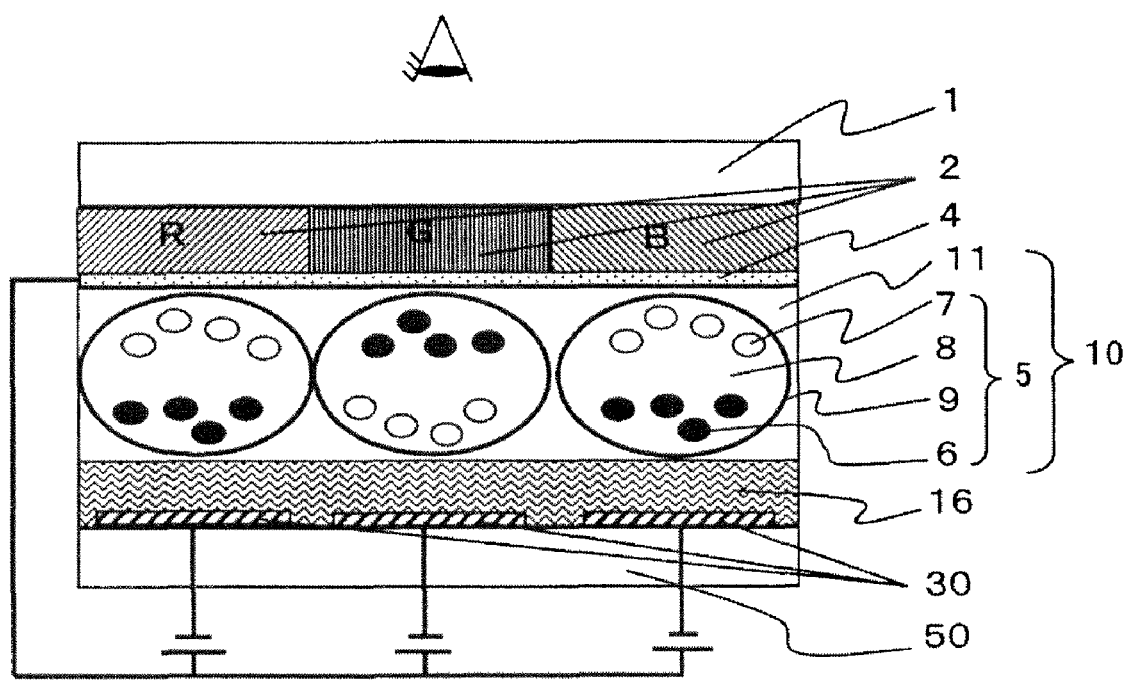
FIG. 2 is a schematic enlarged cross sectional diagram explaining a structure of one embodiment of a multi color display panel of the present invention.

FIG. 1 is a schematic cross sectional diagram explaining an example of a structure of a multi color display panel related to one embodiment of the present invention. FIG. 2 is a schematic diagram explaining the structure by using an enlarged cross section view. As shown in FIG. 1 and FIG. 2, a cross section structure of a multi color display panel of the present invention has a color filter layer (2) and a transparent electrode layer (4) on a transparent substrate (1). In addition, a microcapsule layer (10) is directly formed on the transparent electrode layer (4). Here, in the microcapsule layer (10), a microcapsule (5) is dispersed in a binder resin (11), and a dispersion liquid in which an electrophoresis particle is dispersed in a transparent dispersion medium is enclosed in the microcapsule. An optical reflection property of the microcapsule (5) changes depending on a change of an electric field when a voltage is applied. A rear electrode plate including a rear substrate (50) with a pixel electrode (30) is attached to the microcapsule layer (10) through an adhesive layer (16).

In addition, (not shown in figures) according to necessity, in order to reduce bumps of a microcapsule (5), a surface flattening layer (an over coat of only a binder resin) is provided on a microcapsule layer (10).

A glass plate or a resin plate is used for a transparent substrate (1). For example, soda-lime glass, low-alkali borosilicate glass or alkali-free alumino-borosilicate glass can be used as the glass plate. For example, polyethylene terephthalate (PET), polycarbonate, polyimide, polyethylenenaphthalate, polyethersulfone, acrylic resin or polyvinyl chloride can be used as the resin plate.

In a multi color display panel of the present invention, the shape of a pattern of a color filter layer is not especially limited and a preferred shape can be appropriately used. For example, a filter segment of a fine stripe shape in which the segments are parallel to each other or intersect with each other can be used. Alternatively, a filter segment in which the filter segments are arranged in a matrix in a plane can also be used. For example, a pixel structure in which R, G, B and W are combined as shown in FIG. 4 is frequently used. However, a pixel structure is not limited to this. In a color filter layer (2) used in the present invention, a plurality of colored patterns are arranged, and colored pixels are arranged in respective pixel regions. A colored pixel colors transmission light for every pixel. Generally, colored pixels of red (R), green (G) and blue (B) which correspond to light's three primary colors or of yellow (Y), magenta (M) and cyan (C) of three primary colors are arranged. In addition, here, W is a transparent resin used for a photo spacer or the like. W is used with colored pixels so that brightness can be improved by utilizing larger rays of reflection light. A black matrix is not usually used for a color filter constituting a multi color display panel of the present invention.

Figure 3:
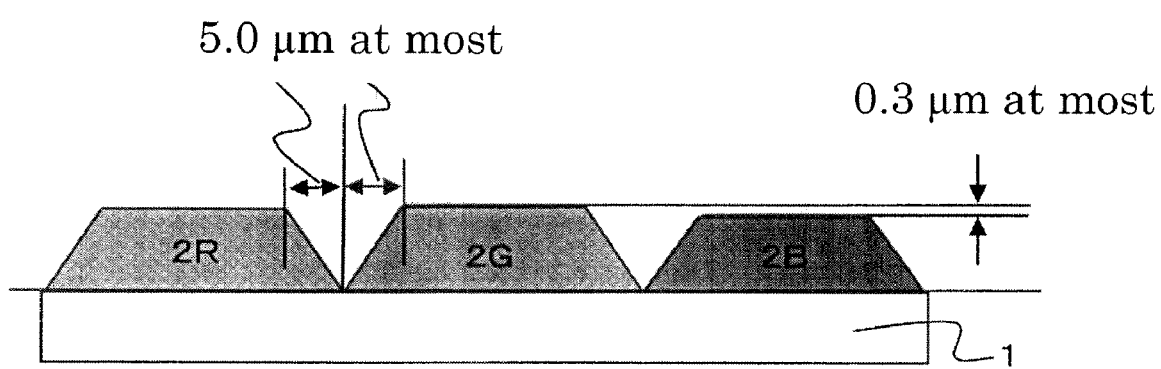
FIG. 3 is a schematic enlarged cross sectional diagram explaining one example of a color filter constituting a multi color display panel of the present invention.

In a multi color display panel of the present invention, the shape of a cross section of a color filter layer (2) is, as shown in FIG. 3, adjusted to become a certain shape in view of applicability of a microcapsule ink and image display characteristics. A film thickness of a color filter layer is 0.5-2.0 µm, more preferably 0.7-1.3 µm. In a multi color display panel of the present invention, light passes twice through a color filter layer. Therefore, in order to maintain brightness, a film thickness is made thinner compared with a transmission type. Alternatively, a color resin having color characteristics with high transmittance is used. In the case of a film thickness of less than 0.5 µm, necessary color density can not be balanced with adhesive properties to a transparent substrate. In addition, in the case of a film thickness of more than 2.0 µm, fluctuation of the film thickness due to development or the like can not be controlled.

A step (difference of film thickness) between pixels inside a display screen is equal to or less than 0.3 µm, and more preferable 0.1 µm. In the case where the step is more than 0.3 µm, a difference in color density is recognized. In addition, an application surface of a microcapsule ink becomes non-uniform such as a wave and therefore image display may be influenced. This difference in film thickness can be controlled by a composition of a resist ink, an exposure condition, a development condition or the like.

In addition, in a color filter for a liquid crystal display panel using a back light, a black matrix (BM) is used between respective pixel patterns for contrast and preventing a color mixture, In addition, in the case where BM is not used, in order to prevent leak light, pixels which are adjacent to each other are overlapped. Therefore, an edge of a pixel rises. In the case where its height is more than 0.3 deviation of a microcapsule ink is generated. This influences uniformity on the application surface. Then, in a color filter of the present invention, pixels are not overlapped with each other. A final cross section shape of respective pixels is usually a trapezoid.

Respective pixels which are adjacent to each other are not overlapped with each other while edges of the bottoms of the trapezoid contact with each other or are separately arranged. Further, a top edge of respective pixels of the trapezoid is within 5.0 μm from a border of a pixel, and more preferably 3.5 μm from a border of a pixel. In the case of a pixel having such a cross section shape, application is possible while a pixel does not rise and deviation of a microcapsule ink is not generated. At the same time, non-uniformity of an image as a surface wave can be controlled, utilization efficiency of reflection light is high and a display panel having a high level of brightness can be obtained.

This color filter layer is generally manufactured as follows. A colored light sensitive resin or a transparent light sensitive resin, the colored light sensitive resin being a light sensitive resin in which a color agent of a pigment or a dye is dispersed or mixed, is applied to a glass substrate by a spin coating method or a spinless coating method so as to have a uniform thickness. Any excess solvent is dried and removed (photolithography). Thereafter, this resist film is irradiated with an active energy beam using an ultrahigh pressure mercury lamp by a proximity exposure through a photo mask of a desirable shape. Thereby, a curing level (a negative type) or alkali solubility (a positive type) is increased. Parts which can be dissolved by an alkali solution or the like are removed, thereby development is performed. Further, post-baking is performed. These operations are repeated several times as needed. In addition, the present invention is not especially limited to the above manufacturing method.

Then, according to necessity, the surface of the color filter layer (2) is polished and flattened. Thereafter, a transparent electrode layer (4) is formed. For example, a transparent conductive oxide of indium oxide system, tin oxide system, zinc oxide system such as ITO can be used as a material of the transparent electrode. A conventional technology such as vaporization method, sputtering method or CVD method can be used for forming this transparent electrode.

Hereinafter, a summary of the display principles of a color filter with a microcapsule which constitutes a multi color display panel of the present invention is explained.

As shown in FIG. 2, a pixel electrode (30) of a rear substrate (50) is connected to a switching element (not illustrated) of each pixel electrode. Thereby a positive and negative voltage can be applied between a pixel electrode and a transparent layer (4). In order to display an image, usually, the pixel electrode (30) is connected to a power source of a circuit constitution of an active matrix driving type. When a voltage is applied to the pixel electrode (30), an electrical field in the microcapsule layer (10) changes. When the pixel electrode (30) is a positive electrode, a negative charged particle in a microcapsule (5) moves toward a side of the pixel electrode (30) of a rear surface, and a positive charged particle moves towards a side of the transparent electrode layer (4) of a front surface. Similarly, when the pixel electrode (30) is a negative electrode, a positive charged particle moves towards a side of a pixel electrode, and a negative charged particle moves towards a side of the transparent electrode layer (4). Here, if, for example, a black particle has a positive charge and a white particle has a negative charge, the display color is the color of a particle which moves towards a side of the transparent electrode layer (4) of a front surface. Therefore, light from an observer side is reflected by the particle, and the reflected light passes through a color pattern of an opposing color filter, thereby the color of a desirable character or image can be displayed.

Next, a material and a component used for a multi color display panel of the present invention are further explained.

The microcapsule (5) used for forming a microcapsule with a color filter is comprised of a colored particle (6), a white particle (7), a transparent dispersion medium (8) and a microcapsule shell (9).

Generally, a microcapsule used for a microcapsule type electrophoresis display panel is refined by a bolting method, a gravity separation method or the like. Its average diameter is 30-100 μm. Furthermore, the proportion of a microcapsule having a capsule with a diameter within 10 μm with respect to an average diameter of a microcapsule is more than 50%. This is applied to a microcapsule used for a multi display panel of the present invention. The distribution of a particle diameter of a microcapsule used for a multi color display panel of the present invention is adjusted so as to have the above distribution in a microcapsule layer.

A water type solvent such as alcohol is used for a microcapsule dispersion liquid. If there is no particular problem, water is used.

A transparent dispersion medium (8) is selected from an insulating liquid in which an electrically charged particle can be properly and stably electric charged, that is, an organic solvent which is substantially insoluble in water. For example, long chain alcohol-based solvents such as dodecanol and undecanol; multicarbon ketones such as dibutyl ketone and methyl isobutyl ketone; aliphatic hydrocarbons such as pentane, hexane and octane; alicyclic hydrocarbons such as cyclohexane and methylcyclohexane; aromatic hydrocarbons such as benzene, toluene, xylene, hexylbenzene, butylbenzene, octylbenzene, nonylbenzene, decylbenzene, undecylbenzene, dodecylbenzene, tridecylbenzene, tetradecylbenzene and other benzenes having a long chain alkyl group; halogenated hydrocarbons such as methylene chloride, chloroform, carbon tetrachloride and 1,2-dichloroethane; and various oils such as silicon oil and olive oil, or a mixture thereof are exemplified.

A black pigment such as aniline black and carbon black, a fine powder such as glass and resin, and a composite body thereof are used for a black electrophoresis particle as a colored particle (6). In addition, a black particle using carbon black is usually used in a multi color display panel of the present invention which displays a multi color by a color filter. In addition, a white inorganic pigment such as well-known titanium oxide, silica, alumina and zinc oxide, an organic compound such as vinyl acetate emulsion, and a composite body thereof are used for a white electrophoresis particle as a white particle (7).

According to necessity, a surface of the colored particle (6) and a white particle (7) is treated by using various surfactant agents, dispersing agents, organic compounds, inorganic compounds, metals or the like. Thereby, the surface can have a surface charge, and dispersing stability in a transparent dispersion medium (8) can be improved.

A dispersion liquid A in which the colored particle (6) and the white particle (7) are dispersed in a transparent dispersion medium (8) is enclosed in a microcapsule using a well-known method such as a phase separation method of a complex coacervation, an interfacial polymerization method, an in-situ method and a hotmelt microencapsulation method. A microcapsule shell (9) is, for example, a film of rubber or gelatin. A material through which light transmits well is preferable for a material for forming a microcapsule. For example, urea-formaldehyde resin, melamine-formaldehyde resin, polyester resin, polyurethane resin, polyethylene resin, polystyrene, polyamide resin, acrylic acid ester resin, methacrylic acid ester resin, polyvinyl acetate resin, rubber and gelatine are exemplified. A single material thereof or a mixed material thereof can be used.

A microcapsule ink is prepared by mixing a microcapsule dispersion liquid with a viscosity improver, surfactant agent, a binder resin (11) or the like, the microcapsule dispersion liquid having a dispersed refined microcapsule having a different diameter distribution. A dielectric resin such as polylactic acid, phenol resin, polypropylene resin, acrylic resin, and polyurethane resin is used for a binder resin (11) of a microcapsule ink. In addition, in the case where inks are mixed after microcapsule inks of two or more kinds are prepared, the inks to be mixed are adjusted to have the same density in order to prevent ink density from changing after mixing the inks.

The microcapsule layer (10) is formed as follows. The microcapsule ink is, as mentioned above, directly applied to the transparent electrode layer (4) of a transparent substrate made of a glass substrate or a resin substrate on which the color filter layer (2) and the transparent layer (4) are formed in advance. Application is performed by an application apparatus such as a screen printing type, a micro gravure coater, a kiss coater, a comma coater, a die coater, a bar coater and a curtain coater. However, in the present invention, a slot die coater can be preferably used.

As mentioned above, the manufactured microcapsule layer (10) has a surface with bumps. Therefore, a distance between electrodes sandwiching a microcapsule cell does not easily become constant. Therefore, it is preferred that a surface flattening layer is formed by applying a surface flattening ink to the microcapsule layer (10). When a surface flattening layer is formed, an adhesive can be directly applied to the surface flattening layer. In the case where an adhesive is directly applied without a flattening layer, if a non-applied spot exists such as a pin hole in the microcapsule layer (10), an adhesive directly contacts with the transparent electrode layer (4) in a side of a color filter, thereby a dielectric constant changes. Therefore, it is difficult for a voltage to be applied to a microcapsule. As a result, display becomes unclear.

In the surface flattening ink, a resin as a binder is dispersed in a solvent. It is preferable that a binder component thereof has a dielectric constant which is equal to a dielectric constant of a resin of a binder component used for a microcapsule ink or a binder component used for an adhesive. It is most preferable that binder resin components of a microcapsule ink, an adhesive layer and a surface flattening ink are identical. If resins having different dielectric constants are used, resins having different constants are arranged between electrodes. Further, thicknesses of respective resins differ according to a size of a microcapsule at this part. In this case, a voltage applied to a microcapsule does not easily become uniform over the entire region of a screen.

A solvent used for a microcapsule ink can be used for a solvent of a surface flattening ink. However, a water system solvent such as alcohol may be also used. Application of a surface flattening ink is performed by using an application apparatus such as a curtain coater and a slot die coater. An application type which cuts an application liquid of a blade coater or the like can not be used because it breaks the microcapsule inside the microcapsule layer.

It is preferable that a thickness of the surface flattening layer is 10-30 μm. In the case where the thickness is lower than 10 μm, bumps of a surface of the microcapsule can not be flattened. On the other hand, in the case where the thickness is more than 30 μm, a distance between electrodes becomes long. This causes an increase in the driving voltage.

As mentioned above, a surface flattening layer is formed and a solvent is sufficiently vaporized. Thereby, a color filter with a microcapsule is formed. This color filter with a microcapsule is attached to a rear electrode plate in which a pixel electrode is arranged on a rear substrate, through an adhesive layer, while position adjustment between a colored pattern (a pixel) of a color filter and a pixel electrode of a rear electrode is performed. Thereby, an electrophoresis type multi color display panel can be manufactured.

It is preferable that a synthetic resin type adhesive such as an urethane resin type adhesive and an acrylic resin type adhesive is used. Especially, an adhesive using a resin having a high dielectric constant is preferable.

It is possible to directly apply an adhesive to the microcapsule layer or the pixel electrode. However, in the manufacturing method of the present invention, an adhesive using the same component as a binder resin used for the microcapsule ink is applied to a resin peeling substrate in which a conductive layer is formed between a silicon film and a resin substrate. A resin peeling substrate with an adhesive is preferably used as an adhesive sheet. When an adhesive having a component which is the same as a binder resin used for a microcapsule ink is used, an affinity with the interface of a resin is increased and thereby peeling does not easily occur. In addition, dielectric constants are similar to each other and therefore a voltage applied to a microcapsule becomes uniform over the entire surface.

In addition, if a resin peeling substrate in which a conductive layer is formed between a silicon film and a resin substrate is used, the following merit is obtained. A multi layer substrate in which the adhesive sheet is formed on a color filter with a microcapsule, a so-called color filter electrophoresis display type front plate can be subjected to a driving evaluation and quality confirmation. In addition, a conductive layer used here does not have to be transparent and the following films may be used. A thin film on which a metal such as copper and aluminum is deposited or electrodeposited and a film to which a conductive polymer is applied can be used.

In a multi color display panel of the present invention, a microcapsule layer is directly formed on a transparent electrode layer on a color filter layer which has very flat and includes a small difference in a film thickness. Therefore, a microcapsule ink is easily and uniformly applied. In addition, a microcapsule layer is very near a color filter layer, which is a surface of a display. Thereby, a multi color display panel with improved image quality can be obtained. In addition, a multi color display panel with small non-uniformity of color density can be obtained, the small non-uniformity of color density caused by a difference in a film thickness of a color filter layer through which light transmits twice (a reflection type).

In addition, if the present invention is compared with a conventional display panel which is formed by attaching a microcapsule layer to a color filter substrate which is manufactured separately, an unnecessary layer such as adhesive is not arranged between a microcapsule layer and a color filter layer in a structure of the present invention. Therefore, light reflected by a microcapsule layer passes a minimum layer and thereby display brightness is improved compared with the conventional display panel.

In addition, if a color filter layer is separated from a microcapsule layer, a color deviation between a display of a microcapsule layer and a color filter is observed. If a color filter layer is closely-attached to a microcapsule, the disparity is not observed, thereby narrowing of a viewing angle does not occur. In addition, in a multi color display panel of the present invention, a color filter layer is very flat and a transparent electrode layer is formed thereon with a high level of flatness, thereby, the distance between the transparent electrode and a pixel electrode layer can be kept constant, wherein the pixel electrode layer faces the transparent electrode. Therefore, a uniform voltage is applied to a microcapsule and a display quality of an image is improved without non-uniformity (unevenness) in a display.

EXAMPLE

Hereinafter, specific examples of the present invention are explained.

A titanium oxide powder (a white powder) of 3 μm average diameter, the surface of which was covered by a polyethylene resin, and a carbon black powder (a black powder) of 4 μm average diameter, the surfaces of which are treated by alkyl trimethylammonium chloride, were dispersed in a transparent dispersion medium of tetrachloroethylene. Thereby a dispersion liquid A was prepared. In this case, a white particle was charged negative, and a black particle was charged positive.

Next, a water solution in which gelatin and sodium polystyrene sulfonate were dissolved in water was prepared. The water solution was mixed with the dispersion liquid A. The mixed liquid was adjusted to 40 degrees Celsius. Thereafter, the mixed liquid was stirred by a homogenizer while the temperature of the mixed liquid was maintained, Thereby an O/W emulsion was obtained.

Next, the O/W emulsion and a water solution in which gum arabic was dissolved in water were mixed by a dispenser at 40 degrees Celsius. The pH of the solution was adjusted to be 4 by using acetic acid while the temperature of the solution was maintained at 40 degree Celsius. A microcapsule having a gelatin/acacia shell material was formed by a complex coacervation method.

Further, the temperature of the solution was reduced to 5 degree Celsius. Thereafter, a formalin solution (37 wt %) was added and thereby a wall material of a microcapsule shell was hardened. Thereby, a microcapsule was obtained in which the dispersion liquid in which a white particle (titanium oxide) and a black particle (a carbon black particle) were dispersed was enclosed.

The microcapsule obtained in this way was bolted and the particle diameter of the microcapsule was made uniform so that the average diameter of the particle was 60 μm and the proportion of microcapsules of 50-70 μm diameter was equal to or more than 50%.

Next, a microcapsule with a uniform diameter was used as a solid content. A water dispersion liquid having 40 wt % of the solid content was prepared. A microcapsule ink was manufactured by mixing the water dispersion liquid with an urethane system binder having 25 wt % of solid content (CP-7050, a product of DIC), a surfactant agent, a viscosity improver, and a pure water.

On the other hand, a color filter was manufactured by the following method. Here, "part" means "parts by weight". Firstly, acrylic resin was manufactured by copolymerizing 50 parts of butyl methacrylate, 20 parts of methyl methacrylate and 30 parts of acrylic acid wherein cyclohexane is used as a solvent.

An acrylic resin solution was prepared using 25 parts of the acrylic resin and 47 parts of a solvent. 20 parts of red pigments (Pigment Red 22) was mixed with the acrylic resin solution. This was dispersed for 1 hour by using a bead mill. Thereafter, 4 parts of dipentaerythritol and 4 parts of hexaacrylate as a light sensitive monomer, and 0.3 part of bis(2,4,6-trimethylbenzoyl)-phenyl phosphine oxide as a photopolymerization initiator were mixed by a disperser. Thereby, a red color photo resist material was prepared.

This red color photo resist material was applied to a transparent glass substrate (400 mm (vertical)×320 mm (horizontal), thickness 0.7 mm) by a spin coating method. The coated glass was left for 5 minutes at a room temperature and a film surface was flattened. Thereafter, the coated glass was dried for 20 minutes at 70 degrees Celsius and a red color photo resist layer was formed.

Figure 4A:
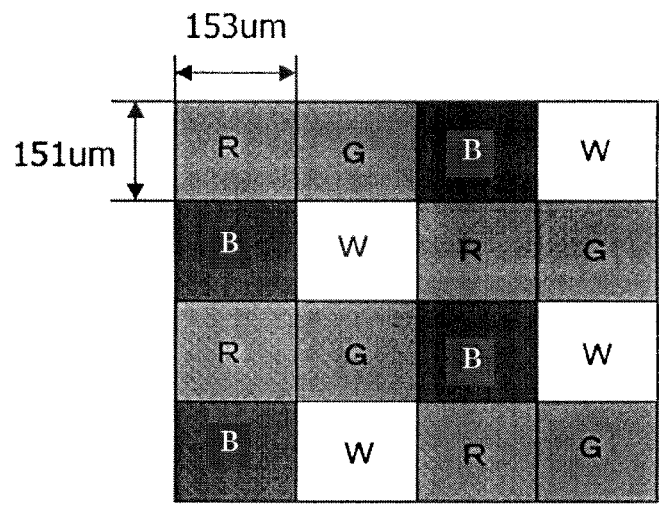
FIG. 4(a) is an enlarged planar view explaining one example of a color filter constituting a multi color display panel of the present invention.
Figure 4B:
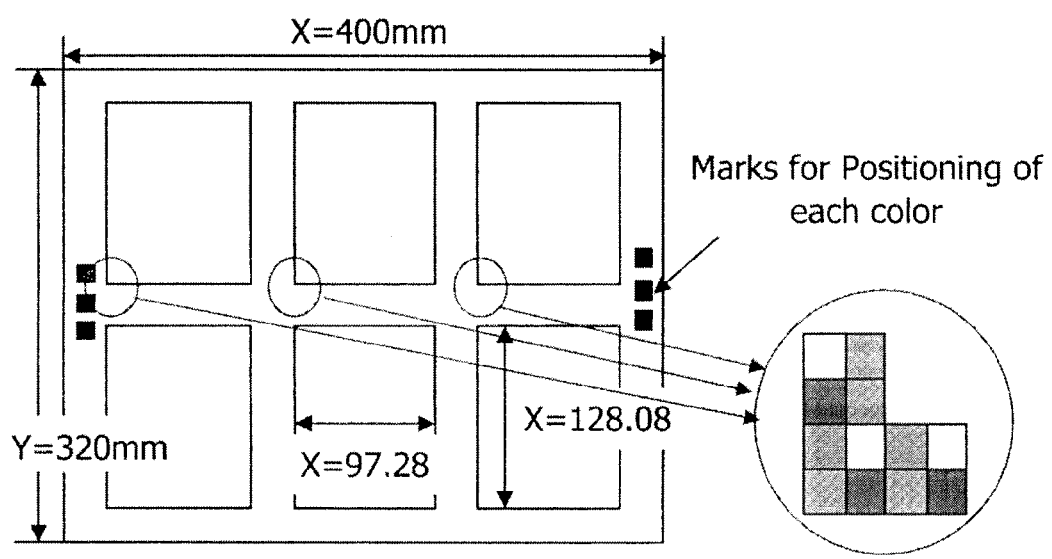
FIG. 4(b) is a planar view explaining one example of a color filter constituting a multi color display panel of the present invention.

Then, this red color photo resist layer was contact-exposed under a condition of an exposure amount of 150 mJ/cm$^2$ through a photo mask which was arranged at a position of red color exposure, using an ultrahigh pressure mercury lamp. The photo mask had six patterns, with the size of each of the patterns being 97.28 mm (vertical)×128.08 mm (horizontal) corresponding to a display screen, as shown in FIG. 4(b). Further, as shown in FIG. 4(a), the photo mask corresponds to a pattern of a pixel size of 302 μm×306 μm which was comprised of R, G, B and W. The pattern corresponding to a pixel was repeated in both a vertical direction and a horizontal direction in the photo mask. As shown in FIG. 4(a), a sub pixel size was 151 μm×153 μm. After the exposure, a spray development in which 1% of sodium carbonate solution was sprayed under 1 kg/cm2 of pressure was performed for 30 seconds and the non-exposed part was removed and a glass substrate was exposed. The glass substrate was dried after the developing process. Thereafter, the glass substrate was heated for 1 hour at 230 degrees Celsius, a film hardening process was performed, and a red color patter of 1.1 μm film thickness was obtained.

Next, a green photo resist layer was formed on a glass substrate with this red color pattern. Here, a green pigment (Pigment Green 7) was used as a colorant, and a green photo resist material which was formed using the same composition as the red photo resist was used. Then, a photo mask similar to the above photo mask was arranged at a position where a green pattern was formed. Then, a contact exposure was performed under a condition of 200 mJ/cm$^2$ (exposure amount). After the exposure, a spray development in which 1% of sodium carbonate solution was sprayed under 1 kg/cm$^2$ of pressure was performed for 30 seconds, the non-exposed part was removed and a glass substrate was exposed. Similarly, the glass substrate was dried after the developing process. Thereafter, the glass substrate was heated for 1 hour at 230 degrees Celsius, a film hardening process was performed, and a green color pattern of 1.2 μm film thickness was obtained.

Further, similarly, a blue photo resist material using a blue pigment (Pigment Blue 15:6) as a colorant was used, and a blue photo resist layer was formed. Then, a photo mask similar to the above photo mask was arranged at a position where a blue pattern was formed. A non-exposed part was removed, and the glass substrate was exposed. Similarly, the glass substrate was dried after the developing process. Thereafter, the glass substrate was heated for 1 hour at 230 degrees Celsius, a film hardening process was performed, and a blue color pattern of 1.1 μm film thickness was obtained.

Next, a light sensitive acrylic resin from which only a color pigment was excluded was used. By performing similar processes, a W (transparent) pattern of 1.1 μm film thickness was obtained. Respective sub pixels, R, G, B and W, did not overlap with each other in the case where the sub pixels are adjacent to each other. The sub pixels were arranged so that an edge of the bottom of each of the sub pixels contacts with each other. In the case where the edge did not contact with each other, the space between the edges was equal to or less than 1.0 μm. In addition, in any part, a top edge was within 3.3 μm from a border of a pixel. In addition, a step (difference in a film thickness) between respective pixels and the interior of a pixel was 0.15 μm at most.

In this way, a substrate in which a color filter layer was formed on a glass substrate was obtained. Here, in the color filter layer, there were six screens of 6 inches, each screen being 97.28 mm (vertical)×125.08 mm (horizontal), the size of a sub pixel being 151 μm×153 μm, and the size of a pixel comprising R, G, B and W being 302×306 μm. Next, a transparent electrode layer of ITO of 150 nm film thickness was deposited and formed on the entire surface of the color filter layer and the exposed glass substrate without performing a polishing process.

Next, the microcapsule ink was directly applied to the transparent electrode layer on the transparent glass substrate with the color filter layer using a slot die coater. The application was performed as follows. A thickness of a microcapsule layer was 40 μm. Microcapsules did not overlap with each other and a microcapsule with a large diameter was pushed into the microcapsule layer. After application, it was dried for 10 minutes at 60 degrees Celsius and a color filter with a microcapsule was obtained.

Further, a surface flattening ink including urethane binder with 25% of solid content (CP-7050, a product of DIC) was applied to the microcapsule layer of the color filter with the microcapsule, using a slot die coater. The ink was dried and a color filter with a microcapsule on which a surface flattening layer was arranged was obtained.

Alternately, aluminum of 100 nm thickness was deposited on one surface of a polyethylene terephthalate sheet of 50 μm thickness as a conductive layer. Further, a silicon type peeling coat layer was arranged on the aluminum. A polyester-urethane system adhesive was applied to a side of the silicon type peeling coat layer to 20 μm and an adhesive sheet was prepared.

Next, the adhesive sheet was attached to the color filter with the microcapsule with the surface flattening layer and a color filter electrophoresis display type front plate was obtained. The front plate had six screens with a display screen of 6 inches. In this state, a voltage was applied between the transparent electrode layer and the conductive layer, and a driving test of the microcapsule layer was performed.

Next, while the polyester-urethane system adhesive was left on the front plate, the polyethylene terephthalate of 50 μm thickness with the silicon type peeling coat was peeled from the front plate. While position adjustment using a position determining mark of the color filter was performed, the front plate was attached to a surface of a pixel electrode of a rear electrode plate with the pixel electrode of ITO which had a circuit constitution of an active matrix driving type using a thin film transistor on a glass (a TFT substrate corresponding to 6 inch six color filters), wherein 0.50 MP of pressure was applied to the attachment. Further, 6 display screens were separated. Thereby, a microcapsule type electrophoresis display panel with a color filter of the present invention was obtained.

A voltage of about ±15 V was applied between the transparent electrode of the front surface and the pixel electrode of the rear surface of the respective display panels of Example 1, using a standard voltage/current generator (a product of Yokogawa Electric Corporation). Actual display properties were evaluated. In addition, reflectances in cases of color display (white display) and black display were measured using a color difference meter (CR-400, a product of Konica Minolta), thereby contrast was evaluated. Here, contrast=reflectance in the case of a color display (white display)/reflectance in the case of a black display. Further, visual lightness L* was measured by using the meter.

As a result, the six display panels in Example 1 were very bright, had an identical contrast and a multi color display could be realized. Non-uniformity of an image or difference in color density between the six panels due to non-uniformity of application of a microcapsule ink was not detected. Further, in all the display panels, color deviation between a front surface observation and a horizontal direction observation was not detected. An excellent color display in which disparity of color depending on a viewing angle were also improved was possible.

(The disclosure of Japanese Patent Application No. JP2009-217152, filed on Sep. 18, 2009, is incorporated herein by reference in its entirety.)

What is claimed is:

1. A multi color display panel, comprising:
   a transparent substrate;
   a color filter layer;
   a transparent electrode layer;
   a microcapsule layer;
   an adhesive layer; and
   a rear electrode plate,
   wherein the transparent substrate, the color filter layer, the transparent electrode layer, the microcapsule layer, the adhesive layer and the rear electrode plate are arranged in this order, the microcapsule layer is directly formed on the transparent electrode layer, the microcapsule layer is comprised of a binder resin and a microcapsule, the microcapsule being dispersed in the binder resin, a dispersion liquid in which electrophoresis particles are dispersed in a transparent dispersion medium is enclosed in the microcapsule, and an optical reflection property of the microcapsule changes by a change of an electrical field by an applied voltage, the rear electrode plate is an electrode plate in which a pixel electrode is arranged on a substrate, a film thickness of the color filter layer is 0.5-2.0 μm, a step between pixels or the interior of a pixel inside a display screen, the step being a difference in film thickness, is equal to or less than 0.3 μm, one of the pixels does not overlap with an adjacent pixel, and a top edge of each of the pixels of a trapezoid shape is within 5.0 μm from a border of the pixel.

2. The color display panel according to claim 1, wherein the electrophoresis particles are two kinds of particles having different surface electric charges, one being a colored particle and the other being a white particle.

* * * * *